UNITED STATES PATENT OFFICE 2,467,303

PREPARATION OF MONOESTERS OF THIODIACETIC ACID

Frederick C. Frank, Barnsboro, N. J., assignor to Socony-Vacuum Oil Company, Incorporated, a corporation of New York No Drawing. Application March 11, 1948,
Serial No. 14,391

11 Claims. (Cl. 260—481)

This invention relates, broadly, to the preparation of monoesters of thiodicarboxylic acids, and is more particularly concerned with the preparation of monoesters of thiodiacetic acid.

As is well known to those familiar with the art, several processes have been proposed for the preparation of monoesters of thiodiacetic acid. Generally, however, these processes are disadvantageous from one or more standpoints, namely, the relatively high cost of the reactants used and/or the occurrence of side reactions which decreases the yield of desired monoester products and/or the numerous steps involved. For example, monoesters of thiodiacetic acid have been prepared by reacting thioglycolic acid with esters of chloroacetic acid, in an alcoholic solution of sodium ethoxide. Another method has involved the reaction of the di-sodium salt of thioglycolic acid (NaSCH$_2$COONa) with esters of chloroacetic acid.

In these reactions, it is to be noted, the processes require the use of expensive sodium to prepare the sodium ethoxide and the di-sodium salt of thioglycolic acid. Furthermore, several side reactions may occur during these processes. For example, when an alcoholic solution of sodium ethoxide is used to neutralize the hydrogen chloride formed in the reaction between an ester of chloroacetic acid and thioglycolic acid, the product formed undergoes alcoholysis under the conditions of the reaction.

It has now been discovered that monoesters of thiodiacetic acid can be prepared by a relatively inexpensive process which eliminates the possibility of side reactions. It has now been found that monoesters of thiodiacetic acid can be prepared by reacting esters of a haloacetic acid with thioglycolic acid in the presence of a trialkyl amine.

Accordingly, it is an object of the present invention to provide a process for the preparation of monoesters of thiodiacetic acid. A further object is to provide a process for the preparation of monoesters of thiodiacetic acid which is simple and relatively inexpensive. An important object is to provide a process for preparing said esters that eliminates the possibility of undesirable side reactions. Other objects and advantages of the present invention will become apparent to those skilled in the art from the following description.

Broadly stated, this invention provides a process for the preparation of monoesters of thiodiacetic acid which comprises reacting, in a non-polar solvent, thioglycolic acid with a trialkylamine to form a thialkylammonium salt of said acid, reacting said salt with an ester of a haloacetic acid, treating the product thus obtained with a mineral acid, and separating the monoester product thus obtained from the reaction mixture.

Thioglycolic acid (HSCH$_2$COOH) has the properties of a mercaptan and of a carboxylic acid. The hydrogen atom of the mercapto group is very acidic and active. Thioglycolic acid is readily available in commercial quantities.

The trialkylamines used in the process of the present invention are strongly basic compounds having the structure RR'R''N, wherein R, R' and R'' are normal and/or branched-chain alkyl radicals having between one and five carbon atoms per radical. The alkyl radicals are usually of equal size in the same amine. Non-limiting examples of trialkylamines utilizable in the process of the present invention are trimethylamine, triethylamine, tripropylamine, and triamylamine. It is to be clearly understood, however, that the trialkylamine reactant may have alkyl radicals containing different numbers of carbon atoms, such as, for example, methyl diethylamine and dimethylethylamine.

Any non-polar solvent which will not enter into the reaction involved may be used in the process contemplated herein. In practice, it is preferred, however, to use aliphatic and aromatic hydrocarbon solvents such as, for example, petroleum naphtha, benzene, cyclohexane, xylene, n-hexane, diethyl ether, dibutyl ether and toluene.

The mole ratio of the thioglycolic acid reactant to the trialkylamine reactant should be at least as low as 1:1. In practice, it is preferable to use between one and about two moles of amine reactant with each mole of thioglycolic acid. The amount of solvent is not critical. It is preferred, however to use between about 160 per cent and about 240 per cent of solvent by weight, based on the total combined weight of amine reactant and thioglycolic acid reactant.

The reaction between the trialkylamine and the thioglycolic acid in a solvent is carried out at about room temperature (20° C.). Usually a slight temperature rise is noted due to the heat of neutralization, but it is not necessary to cool the reaction mixture to maintain the temperature at a constant level. There appears to be nothing critical in the temperature employed. As a result of this reaction a homogeneous solution in the non-polar solvent of the trialkylammonium salt of thioglycolic acid, along with excess amine, will be obtained.

In practice, it is desirable to carry out the operation under an atmosphere of an inert gas, such as, for example, nitrogen, hydrogen, and helium, to exclude atmospheric gases from the reaction zone. Protection with an inert gas is especially desirable during the first operation of the present process, for reasons which will be obvious to those skilled in the art.

The trialkylammonium salt solution is reacted with an ester of a haloacetic acid in a molar ratio of about 1:1, although the ratio may vary between about 2:1 and about 1:2. The esters of haloacetic acid utilizable in the present process have the structure, $XCH_2COOR$, wherein X is chlorine, bromine, iodine, or fluorine and R is an aliphatic radical having between about one and about twenty carbon atoms per radical, and, preferably, an aliphatic radical having between about two and about eighteen carbon atoms per radical. Non-limiting examples of the haloacetic acid ester reactant are ethyl chloroacetate, ethyl fluoroacetate, n-octyl bromoacetate, 2-ethylhexyl iodoacetate, dodecyl chloroacetate, dodecenylchloroacetate, octadecyl bromoacetate, and octadecenylchloroacetate. They are prepared by the direct esterification of a haloacetic acid with the appropriate alcohol. For example, 2-ethylhexylchloroacetate is prepared by esterifying chloroacetic acid with 2-ethylhexanol-1.

The reaction between the ester of a haloacetic acid and the trialkylammonium salt can be carried out at about room temperature (20° C.). It is preferable, during the latter part of the reaction period, to heat the reaction mixture to a temperature falling within the range varying from about 80° C. to about 100° C. for about 1 or 2 hours.

The reaction time is dependent on the reaction temperature and the specific reactants used. For all practical purposes, the reaction is usually complete in about 5 hours total reaction time.

During the course of the reaction involved herein, hydrogen halide evolves and immediately reacts with the trialkylamine to form the trialkylamine hydrohalide, according to the following equation:

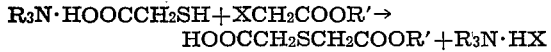

$$R_3N \cdot HOOCCH_2SH + XCH_2COOR' \rightarrow$$
$$HOOCCH_2SCH_2COOR' + R_3N \cdot HX$$

When an excess of amine reactant is used, some of the thiodiacetic acid monoester product will be in the form of a trialkylammonium salt. The free acid ester is obtained by treating the salt with a mineral acid, such as hydrochloric acid. The amine is converted to the hydrochloride, according to the following equation:

$$R_3N \cdot HOOCCH_2SCH_2COOR' + HCl \rightarrow$$
$$HOOCCH_2SCH_2COOR' + R_3N \cdot HCl$$

As will be obvious to those skilled in the art, this operation is not necessary when the molar ratio of amine to thioglycolic acid is 1:1, since all of the trialkylamine is utilized by the hydrogen halide evolved during the reaction and the monoester product is obtained as the free acid ester at the close of the reaction. The amine hydrohalide formed in the foregoing reactions is a solid which is insoluble in the reaction medium. It is removed by conventional methods of separation of solids from liquids, such as, for example, by filtration.

The amine can be recovered from the salt, quantitatively, by treating the amine hydrohalide with an aqueous solution of caustic material, such as sodium hydroxide, and separating the liberated amine from the aqueous phase.

The following specific examples illustrate the mode of preparing monoesters of thiodiacetic acid in accordance with the process of the present invention. It is to be clearly understood that the invention is not to be limited to the specific embodiments set forth hereinafter, or to the operations and manipulations described therein. As will be apparent to those skilled in the art, a wide variety of other trialkylamines, esters of haloacetic acid, and solvents, as set forth hereinbefore, may be used to prepare the monoesters of thiodiacetic acid in accordance with this invention.

EXAMPLE

Into a one-liter flask equipped with a mechanical stirrer, a reflux condenser (having a 250 cubic centimeter dropping funnel extending into the upper opening), a nitrogen inlet tube, and a thermometer, were placed 200 cubic centimeters of dry benzene and 35 grams (0.382 mole) of freshly distilled thioglycolic acid. The reaction flask was continuously swept with nitrogen gas during the reaction. From the dropping funnel, 77 grams (0.764 mole) of triethylamine were added dropwise, through the condenser, at room temperature. The time of addition was about forty minutes, and the maximum temperature rise of the reaction mixture was to 35° C.

To the homogeneous solution containing the triethylammonium thioglycolate thus formed, and excess thiethylamine, was added dropwise from the dropping funnel 78.6 grams (0.382 mole) of n-octylchloroacetate at a temperature of about 28° C. The addition consumed a period of about one hour. The temperature of the reaction mixture rose spontaneously to a maximum of about 51° C. The mixture was stirred for about 1¼ hours and then heated at reflux temperature (81° C.) for another hour.

The reaction mixture was cooled in an ice bath and the amine hydrochloride was filtered off on a suction filter. The solid amine hydrochloride was washed with benzene and dried in air. The recovery of dry amine hydrochloride was 51.6 grams (theory=52.7 grams), amounting to a 98 per cent recovery.

The free mono-n-octylthiodiacetate was isolated from the triethylammonium salt thereof by treating the benzene solution of the product with about 50 cubic centimeters of concentrated hydrochloric acid. The solution was washed with distilled water and filtered. The clear solution was topped of benzene at atmospheric pressure at a pot temperature of about 115° C., and finally at a pot temperature of about 150° C. under about 0.5 millimeter pressure. There was no distillate from the vacuum distillation. The 82.1-gram yield of product (theory=100.5 grams) amounted to a yield of 81.7 per cent.

The properties of the product made in this run appear in the table. Data are also given for other runs which were made by the same procedure used in the example, using various chloroacetic ester reactants and varying the ratio of amine reactant to thioglycolic acid.

Table

| Example | Monoester (R) | Mole Ratio TEA[1] | Per Cent Yield of Monoester | Saponification No. | | Neutralization No. | | Per Cent Sulfur | |
|---|---|---|---|---|---|---|---|---|---|
| | | | | Theory | Found | Theory | Found | Theory | Found |
| I | n-octyl | 2:1 | 81.7 | 426 | 388 | 213 | 177 | 12.2 | 11.3 |
| II | n-octyl | 2:1 | 95.0 | 426 | 394 | 213 | 203 | 12.2 | 12.1 |
| III | n-octyl | 1.5:1 | 88.0 | 426 | 423 | 213 | 202 | 12.2 | 11.7 |
| IV | 2-ethylhexyl | 1.5:1 | 93.0 | 426 | 401 | 213 | 203 | 12.2 | 11.7 |
| V | do | 1.3:1 | 80.0 | 426 | 417 | 213 | 191 | 12.2 | 11.9 |
| VI | do | 1:1 | 61.0 | 426 | 415 | 213 | 200 | 12.2 | 11.6 |
| VII | ethyl | 1:1 | 91.0 | 630 | 549 | 315 | 319 | 18.0 | 16.4 |
| VIII | octadecenyl | 1.5:1 | 99.0 | 280 | 302 | 140 | 126 | 8.0 | 8.8 |

[1] Mole ratio of triethylamine to thioglycolic acid.

It will be apparent from the data in the table, that good yields of monoesters of thiodiacetic acid of good purity are obtained by the process described herein. Good products, as shown by the saponification numbers, neutralization numbers, and sulfur content, have been obtained in excellent yield, regardless of the molar ratio of amine reactant to thioglycolic acid, and regardless of the size of the ester group on the monoester.

The monoesters of thiodiacetic acid are valuable intermediates for organic synthesis. They can also be utilized as flotation agents, additives for lubricating oils, etc.

I claim:

1. A process for preparing monoesters of thiodiacetic acid, which comprises: reacting a trialkylamine wherein the alkyl radicals contain up to five carbon atoms, with thioglycolic acid in a molar ratio of at least 1:1, respectively, in a non-polar solvent, to form a trialkylammonium salt of thioglycolic acid; reacting said trialkylammonium salt of thioglycolic acid with an ester of a haloacetic acid having the formula $$XCH_2COOR$$

wherein R is an aliphatic radical having between one and twenty carbon atoms per radical, and X is a halogen; and separating the monoester product thus obtained from the reaction mixture.

2. A process for preparing monoesters of thiodiacetic acid, which comprises: reacting a trialkylamine wherein the alkyl radicals contain up to five carbon atoms, with thioglycolic acid in a molar ratio of at least 1:1, respectively, in a non-polar solvent, to form a trialkylammonium salt of thioglycolic acid; reacting said trialkylammonium salt of thioglycolic acid with an ester of a haloacetic acid having the formula $XCH_2COOR$, wherein R is an aliphatic radical having between two and eighteen carbon atoms per radical, and X is a halogen; treating the product thus obtained with a mineral acid; and separating the monoester product thus obtained from the reaction mixture.

3. A process for preparing monoethyl thiodiacetate, which comprises: reacting a trialkylamine wherein the alkyl radicals contain up to five carbon atoms, with thioglycolic acid in a molar ratio of at least 1:1, respectively, in a non-polar solvent, to form a trialkylammonium salt of thioglycolic acid; reacting said trialkylammonium salt of thioglycolic acid with an ester of a haloacetic acid having the formula $XCH_2COOR$, wherein R is an ethyl radical, and X is a halogen; treating the product thus obtained with a mineral acid; and separating the monoester product thus obtained from the reaction mixture.

4. A process for preparing monoethyl thiodiacetate, which comprises: reacting a trialkylamine wherein the alkyl radicals contain up to five carbon atoms, with thioglycolic acid in a molar ratio of at least 1:1, respectively, in benzene, to form a trialkylammonium salt of thioglycolic acid; reacting said trialkylammonium salt of thioglycolic acid with ethyl chloroacetate; treating the product thus obtained with a mineral acid; and separating the monoester product thus obtained from the reaction mixture.

5. A process for preparing monoethyl thiodiacetate, which comprises: reacting triethylamine with thioglycolic acid in a molar ratio of about 1:1, respectively, in benzene, to form triethylammonium thioglycolate; reacting said triethylammonium thioglycolate with ethyl chloroacetate; treating the product thus obtained with hydrochloric acid; and separating the monoester product thus obtained from the reaction mixture.

6. A process for preparing mono-2-ethylhexyl thiodiacetate, which comprises: reacting a trialkylamine wherein the alkyl radicals contain up to five carbon atoms, with thioglycolic acid in a molar ratio of at least 1:1, respectively, in a non-polar solvent, to form a trialkylammonium salt of thioglycolic acid; reacting said trialkylammonium salt of thioglycolic acid with an ester of a haloacetic acid having the formula $XCH_2COOR$, wherein R is 2-ethylhexyl radical and X is a halogen; and separating the monoester product thus obtained from the reaction mixture.

7. A process for preparing mono-2-ethylhexyl thiodiacetate, which comprises: reacting a trialkylamine wherein the alkyl radicals contain up to five carbon atoms, with thioglycolic acid in a molar ratio of at least 1:1, respectively, in benzene, to form a trialkylammonium salt of thioglycolic acid; reacting said trialkylammonium salt of thioglycolic acid with 2-ethylhexylchloroacetate; treating the product thus obtained with a mineral acid; and separating the monoester product thus obtained from the reaction mixture.

8. A process for preparing mono-2-ethylhexyl thiodiacetate, which comprises: reacting triethylamine with thioglycolic acid in a molar ratio of about 1.5:1, respectively, in benzene, to form triethylammonium thioglycolate; reacting said triethylammonium thioglycolate with 2-ethylhexylchloroacetate; treating the product thus obtained with hydrochloric acid; and separating the monoester product thus obtained from the reaction mixture.

9. A process for preparing mono-n-octyl thiodiacetate, which comprises: reacting a trialkylamine wherein the alkyl radicals contain up to five carbon atoms, with thioglycolic acid in a molar ratio of at least 1:1, respectively, in a non-polar solvent, to form a trialkylammonium salt of thioglycolic acid; reacting said trialkylammonium salt of thioglycolic acid with an ester of a haloacetic acid having the formula $XCH_2COOR$, wherein R is a n-octyl radical, and X is a halogen; and separating the monoester product thus obtained from the reaction mixture.

10. A process for preparing mono-n-octyl thiodiacetate, which comprises: reacting a trialkylamine wherein the alkyl radicals contain up to five carbon atoms, with thioglycolic acid in a molar ratio of at least 1:1, respectively, in benzene, to form a trialkylammonium salt of thioglycolic acid; reacting said trialkylammonium salt of thioglycolic acid with n-octylchloroacetate; treating the product thus obtained with a mineral acid; and separating the monoester product thus obtained from the reaction mixture.

11. A process for preparing mono-n-octyl thiodiacetate, which comprises: reacting triethylamine with thioglycolic acid in a molar ratio of about 2:1, respectively, in benzene, to form triethylammonium thioglycolate; reacting said triethylammonium thioglycolate with n-octylchloroacetate; treating the product thus obtained with hydrochloric acid; and separating the monoester product thus obtained from the reaction mixture.

FREDERICK C. FRANK.

No references cited.